3,297,634
CYCLIC DICARBONATE
Bryce C. Oxenrider, Florham Park, and Ralph M. Hetterly, Morristown, N.J., assignors to Allied Chemical Corporation, New York, N.Y., a corporation of New York
No Drawing. Filed Feb. 4, 1963, Ser. No. 256,098
15 Claims. (Cl. 260—47)

This invention relates to production of a new cyclic dicarbonate from α,α' - bis(p-hydroxyphenyl)1,4 - diisopropylbenzene and its conversion into a polycarbonate resin.

Cyclic carbonates possessing five-membered rings are well known in the art and are generally prepared by the interaction of vicinal 1,2-diols with phosgene. The success of such cyclization reactions is highly dependent upon the proximity of the hydroxy groups within the molecules. Thus, a cyclic carbonate possessing a five-membered ring is produced by reacting a diol which has adjacent hydroxy groups with phosgene in an alkaline medium. The more remotely the hydroxy groups are positioned from one another, the less likely will be the success of a cyclization reaction with phosgene. Thus, those compounds wherein the hydroxy groups are 1,4 or even more remotely positioned, as in the bisphenols, rarely form cyclic carbonates upon reaction with phosgene but tend to form linear polycarbonates instead.

One object of this invention is to provide a cyclic dicarbonate prepared from α,α'-bis(p-hydroxyphenyl)1,4-diisopropylbenzene. A further object of the invention is to provide a process for the preparation of the cyclic dicarbonate. A still further object is to provide processes for the conversion of the dicarbonate into a linear polycarbonate resin. Other objects and advantages will appear in the following description and examples.

According to the present invention, a cyclic dicarbonate may be produced by admixing an aqueous alkaline solution possessing a pH of at least about 9 and containing from about 0.1 to 5 percent by weight of α,α'-bis(p-hydroxyphenyl)1,4-diisopropylbenzene with an inert, substantially water-insoluble organic solvent, agitating the mixture so as to create an emulsion thereof, passing phosgene into the emulsion in the presence of a phosgenation catalyst at rate such that the weight ratio per minute of phosgene contacted with the emulsion is no greater than about $10^{-3}:1$ and recovering the cyclic dicarbonate from the resulting reaction mass.

The cyclic dicarbonate so formed may be represented by the following structural formula:

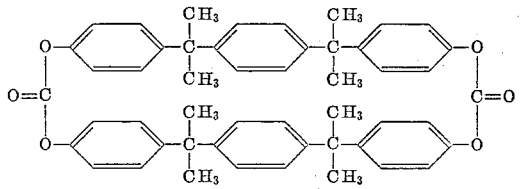

Cyclo - bis - 4,4' - (α,α'-diphenyl-α,α,α',α'-tetramethylxylylyl)dicarbonate has been found to be eminently useful an as intermediate in preparation of a α,α'-bis(p-hydroxyphenyl)1,4 - diisopropylbenzene polycarbonate resin of exceptionally high purity. Production of such a pure polycarbonate resin in a single step possesses significant advantages over prior art processes which produce polycarbonates highly contaminated by alkali, salts and alcohols in the crude reaction mixture and require extensive and costly purification procedures.

Although we do not wish to be bound by any theory, it appears that an essential feature of the process for the preparation of the cyclic dicarbonate is the relatively high dilution of the reactants. It is postulated that the addition of α,α'-bis(p-hydroxyphenyl)1,4-diisopropylbenzene to an aqueous alkaline solution converts the bisphenol to its corresponding dibasic salt. The addition of phosgene in dilute concentration converts the bisphenate salt into a derivative having monochloroformate and phenoxy-salt moieties. It is further postulated that the derivative aligns itself in such fashion that the monochloroformate moiety is dissolved in the organic phase of the reaction mixture while the phenoxy-salt moiety is dissolved in the aqueous alkaline phase. It is further postulated that the derivative aligned at the interface of the two-phase reaction system reacts with the catalyst. The catalyst displaces the cationic portion of the phenoxy-moiety of the derivative and, hence, renders the derivative completely soluble in the organic phase of the emulsion reaction mixture. Due to the low concentration of the bisphenol employed in our process, the bisphenol monochloroformate-catalyst complex exists in sufficiently high dilution in the organic phase to permit the complex to undergo initial dimerization followed by an intermolecular cyclization rather than the intermolecular polymerization leading to a linear polycarbonate resin.

It has been found that a concentration of about 0.1 to 5 percent by weight of α,α'-bis(p-hydroxyphenyl)1,4-diisopropylbenzene based upon the amount of the aqueous alkaline solution is required in the present invention. A concentration of less than about 0.1 percent by weight is insufficient to secure significant yields of cyclic dicarbonate, while concentrations in excess of about 5 percent by weight tend to direct the instant reaction to the production of a linear polycarbonate resin. Use of a concentration of about 1 to 3 percent by weight of α,α'-bis(p-hydroxyphenyl)1,4 - diisopropylbenzene based on the amount of the aqueous alkaline solution has been found to produce optimum dicarbonate yields.

The aqueous alkaline solution should contain enough alkaline material to maintain a pH of at least about 9, preferably at least about 11, throughout the reaction. The alkaline material employed may be readily furnished by the hydroxide of an alkali metal or alkaline earth metal such as sodium hydroxide, potassium hydroxide, calcium hydroxide, barium hydroxide and the like. Under these conditions, the α-α'-bis(p-hydroxyphenyl)1,4-diisopropylbenzene is generally present as both solubilized and suspended material.

If a substantial excess of phosgene is present during any time of the reaction, the dichloroformate derivative of α,α' - bis(p-hydroxyphenyl)1,4 - diisopropylbenzene is produced which results in the formation of a linear polycarbonate resin. Accordingly, the phosgene must be introduced to the emulsion at a rate such that the weight ratio per minute of phosgene to emulsion is no greater than about $10^{-3}:1$, as in the order of about $10^{-5}$ to $10^{-3}:1$. Preferably a ratio of about $10^{-5}$ to $10^{-4}:1$ is employed since such ratio provides the optimum conditions for the preparation of the monochloroformate derivative of the bisphenol.

The phosgene is preferably added to the reaction system in a gaseous stream containing a major proportion of an inert gas. Employment of a diluted gas stream enables efficient maintenance of a desirably low phosgene concentration. Inert gases of any type may be employed, but it is preferred to use nitrogen or helium. The concentration of phosgene in the diluted gas mixture is preferably maintained at about 0.5 to 60 percent by volume.

The total amount of phosgene added should be about 0.5 mol to 1.25 mols per mol α,α'-bis(p-hydroxyphenyl)1,4-diisopropylbenzene. Less than 0.5 mol of phosgene per mol of α,α'-bis(p-hydroxyphenyl)1,4-diisopropylbenzene produces relatively poor product yields. If the molar ratio of phosgene to α,α'-bis(p-hydroxyphenyl)1,4-diisopropylbenzene exceeds about 1.25 to 1, it has been found that the dibasic salt of α,α'-bis(p-hydroxyphenyl)1,4-diisopropylbenzene is converted to the dichloro rather than monochloroformate derivative which, in turn, results in the formation of the linear polycarbonate resin and therefore also produces relatively poor product yields. Ratio of about 0.8 to 1.1 mols of phosgene per mol of α,α'-bis(p-hydroxyphenyl)1,4-diisopropylbenzene produces outstanding results and, hence, is preferred. Completion of the desired reaction is usually indicated by a sharp decrease of the pH of the system due to the presence of excess phosgene.

The organic phase is comprised of a substantially water-insoluble organic solvent which is inert under the conditions of reaction. Selection of such a solvent is determined not only by the desired solubilizing action towards the above-mentioned intermediates of the process but also by its substantial water-insolubility which makes such solubilizing action possible, and by its inertness under the reaction conditions. These organic solvents should be free of functional groups, such as hydroxy and amino, which are reactive under the conditions of reaction. Suitable solvents include benzene and its alkylated and chlorinated derivatives such as benzene, o-xylene, m-xylene, p-xylene, chlorobenzene, 4-chloro-o-xylene, 4-chloro-m-xylene and chlorotoluene. Saturated, chlorinated aliphatic hydrocarbons such as ethylene dichloride, methylene dichloride, 1,4-dichlorobutane and 1,3-dichloropropane may also be successfully employed. The weight ratio of aqueous phase to organic phase generally varies from about 3:1 to about 1:10, preferred ratios being about 2:1 to about 1:1.

The phosgenation catalyst which is employed should be sufficiently soluble in both aqueous alkaline and organic phases so that it may partition itself between both reaction phases. This versatile solubility is necessary if the catalyst is to displace the cationic portion of the phenoxide salt in the aqueous phase. The catalysts employed possess the following formula:

$$[AR_1R_2R_3R_4]^+ X^-$$

wherein A is a member of the group consisting of nitrogen, arsenic and phosphorus, $R_1$, $R_2$, $R_3$, and $R_4$ are like or unlike radicals selected from the group consisting of alkyl, alkenyl, aryl and aralkyl and X is a member of the group consisting of hydroxy and halogen, such as chlorine, bromine, iodine and fluorine. The alkyl and alkenyl members of the group may contain from 1 to 4 and from 2 to 5 carbon atoms, respectively. The hydrocarbon chains may be branched or unbranched. Illustrative examples of suitable catalysts are as follows:

Trimethylbenzylammonium chloride
Trimethylbenzylammonium hydroxide
Tripropylbenzylammonium chloride
Tetraphenylphosphonium bromide
Tri(isobutyl)benzylammonium chloride
Dimethyldibenzylammonium iodide
Tetrabutylphosphonium bromide
Triethylbenzylammonium chloride
Triethylbenzylammonium fluoride
Benzyltriethylarsonium chloride The weight ratio of bisphenol reactant to catalyst usually varies from about 10:1 to 100:1, the preferred ratios being about 40:1 to 60:1. The catalyst may be added before, during or after addition of the phosgene with equal success.

In order for the desired cyclization reaction to proceed, it is desirable that intimate contact of the reactants be maintained at all times. This is accomplished by the aqueous alkaline and organic phases existing in an emulsified state. Emulsification may be accomplished by agitation of the reaction mixture with a stirrer and by the addition of emulsifying agents, if necessary. Emulsification is readily obtained by agitation using the aforementioned saturated, chlorinated aliphatic hydrocarbon solvents. When aromatic hydrocarbon solvents are used, addition of a surfactant is desirable. Suitable surfactants may be selected from the class of anionic emulsifiers of which stearyldimethylbenzylammonium chloride is typical.

Reaction temperatures under atmospheric pressure varying from about 10° to 60° C. may be utilized, with temperatures of about 20° to 40° C. being preferred. It should be understood, however, that higher or lower pressures may be used with correspondingly higher and lower temperatures.

The cyclic dicarbonate is readily converted to α,α'-bis(p-hydroxyphenyl)1,4 - diisopropylbenzene polycarbonate resin having recurring units of the formula:

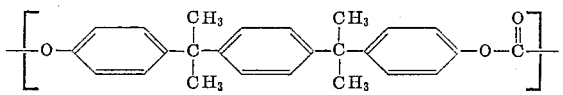

by heating the cyclic dicarbonate at temperatures in the range of about 325° to 375° C. It has been found that temperatures less than about 325° C. are insufficient to melt the cyclic dicarbonate, while temperatures higher than about 375° C. tend to promote decomposition. For rapid conversion to the linear polycarbonate resin substantially anhydrous reaction conditions are maintained throughout the reaction and may be readily secured by carrying out the reaction under vacuum. Pressures of about 0.01 to about 200 millimeters Hg are generally used.

Alternatively, the conversion of the cyclic dicarbonate to the linear polycarbonate resin may be carried out by treating the dicarbonate with an anionic catalyst in the presence of an inert organic solvent such as diethyl carbitol or dioxane and heating the resulting mixture to temperature of at least about 200° C. Suitable anionic catalysts include butyl lithium, alkylmagnesium halides (Grignard reagents), alkali metal hydroxides such as sodium hydroxide and potassium hydroxide, arylmagnesium halides and the like. In preferred operation, catalyst is employed in the amount of from about 0.0001 to 0.05 mol per mol of cyclic dicarbonate.

The resulting α,α'-bis(p-hydroxyphenyl)1,4-diisopropylbenzene polycarbonate resins produced by the above procedures are of such high purity that conventional purification procedures are unnecessary.

The following examples are given for the purpose of illustrating the present invention. In the examples, parts are by weight.

*Example 1*

To a resin flask fitted with a dropping funnel and a gas inlet and outlet containing 150 parts water, 0.75 part sodium hydroxide and 1.5 parts α,α'-bis(p-hydroxyphenyl) 1,4-diisopropylbenzene were added 314 parts of ethylene dichloride and 2.8 parts of a 10 percent by weight aqueous solution of benzyltriethylammonium chloride. The resulting reaction mixture was vigorously agitated by a mechanical stirrer so as to create an emulsion into which a phosgene-nitrogen mixture consisting of 40 percent by volume of nitrogen was added at a rate of 0.105 part phosgene per minute. Simultaneously, a second solution comprised of 400 parts of water, 4.25 parts of sodium hydroxide and 12.25 parts of α,α'-bis(p-hydroxyphenyl)1,4-diisopropylbenzene was added to the reaction mixture through the dropping funnel at a rate of 15 parts per minute. The addition of this solution was continued at temperature of 30° C. for a period of 28 minutes. Phosgene was added at the aforementioned rate throughout the entire reaction and was continued for an additional 10 minutes in order to assure complete reaction.

Aliquot samples were periodically removed in order to determine decrease of reaction mixture basicity. One-half hour after the termination of the phosgene addition, the number of milliequivalents of base present decreased from 42 to 37. The reaction mixture was agitated an additional 30 minutes during which no further change in basicity was observed.

The resulting reaction mixture was allowed to stand whereupon it separated into two phases, an emulsified layer and a lower ethylene dichloride layer containing 10 parts of α,α'-bis(p-hydroxyphenyl)1,4-diisopropylbenzene polycarbonate. Separation of the two layers was attained by decantation, and the emulsified layer was allowed to stand for 48 hours at 20° C. whereupon it solidified as a white mass covered by a small quantity of water. The water was removed by decantation, and the remaining mass was dissolved in ethylene dichloride. The mixture was refluxed at 83° C., cooled to about 25° C. and then filtered. The recovered residue was washed with water until the pH of the water-washings was about 6.

The residue comprised 4 parts of a white crystalline powder slightly soluble in cold tetrachloroethane or in hot ethylene dichloride. 3.5 parts of the residue were recrystallized from 625 parts of ethylene dichloride to produce 2.8 parts of cyclo-bis-4,4'-(α,α'-diphenyl-α,α,α',α'-tetramethylxylylyl)dicarbonate possessing a flow point of 325° to 335° C.

Elemental analysis of the dicarbonate showed 80.20 percent carbon and 7.09 percent hydrogen as compared to the theoretical of 80.65 percent carbon and 6.45 hydrogen.

Infrared absorption spectrogram of a mineral oil mull of the dicarbonate showed bands at the following wave lengths: (strong) 8.14, 8.40 and 8.57 microns; (medium) 5.60 and 6.62 microns; (weak) 9.83, 12.59, 11.77, 11.88, 11.96, 12.10 and 12.22 microns.

Bands at 8.14 and 5.60 microns are indicative of the presence of carbonate groups which would be expected for a molecule of this structure. The absorption band at 6.62 microns is indicative of aromatic C—H bonds.

In addition, an X-ray diffraction pattern diagram of the dicarbonate indicated extremely high crystallinity. This crystallinity is illustrated by the data contained in Table I.

TABLE I

| X-Ray Diffraction Data of [1] | | |
|---|---|---|
| 2ϑ, Degrees [2] | D, Angstroms [3] | RI [4] |
| 8.60 | 10.27 | 16 |
| 11.22 | 7.87 | 100 |
| 12.60 | 7.02 | 14 |
| 13.50 | 6.55 | 9 |
| 14.12 | 6.27 | 11 |
| 14.80 | 5.98 | 42 |
| 15.64 | 5.65 | 50 |
| 16.35 | 5.42 | 60 |
| 17.30 | 5.13 | 45 |
| 18.20 | 4.87 | 54 |
| 19.15 | 4.63 | 72 |
| 19.72 | 4.50 | 14 |
| 21.40 | 4.15 | 27 |
| 22.69 | 3.91 | 49 |

[1] Wave length employed was the CuKα line passed through a nickel filter.
[2] Measured angle of diffraction.
[3] Interplanar spacings of the crystal.
[4] Uncorrected relative intensities of diffraction light.

*Example 2*

To the reaction vessel employed in Example 1 was added 500 parts deionized water, 5 parts sodium hydroxide and 17.3 parts α,α'-bis(p-hydroxyphenyl)1,4-diisopropylbenzene. The mixture was stirred for 5 minutes under a nitrogen atmosphere, at which time 3 parts of a 10 percent by weight aqueous solution of benzyltriethylammonium chloride were added followed by 440 parts of benzene and 2 parts of stearyldimethylbenzylammonium chloirde. The resulting reaction mixture was vigorously stirred for a period of 2.5 hours at temperature of 27° C. during which time a nitrogen-phosgene mixture consisting of 95 percent by volume of nitrogen was passed through the reaction mixture at a rate of about 2 parts phosgene per hour. The reaction mixture was then permitted to stand for 17 hours at 20° C., at the end of which time a white mass separated from the mixture. The solid material was isolated by filtration and washed by slurrying in 395 parts of acetone followed by refiltration. The residue was still further washed with 250 parts water, twice with 250 parts of a 0.48 normal hydrochloric acid solution, twice with 250 parts of water, and twice with 250 parts acetone. The solid product was dried at 80° C. under 150 millimeters Hg pressure. A yield of 13 parts of cyclo-bis-4,4'-(α,α'-diphenyl-α,α,α',α'-tetramethylxylylyl)dicarbonate was obtained. The dicarbonate had a flow point of 323° to 333° C. and possessed the properties obtained for the product of Example 1.

*Example 3*

To the reaction vessel of Example 1 was added a reaction mixture consisting of 13.75 parts of α,α'-bis(p-hydroxyphenyl)1,4-diisopropylbenzene, 500 parts of a 0.01 percent by weight aqueous solution of sodium hydroxide, 314 parts of ethylene dichloride and 2.8 parts of benzyltriethylammonium chloride in the form of a 10 percent by weight aqueous solution. The mixture was then constantly agitated under a nitrogen atmosphere for a period of 38 minutes during which time phosgene diluted with 58 percent by volume of nitrogen was added at a rate of 0.105 part of phosgene per minute. The resulting emulsion mixture was allowed to stand for a period of 19 hours at room temperature. The liquid phase was separated by filtration, and the residue was purified in the manner illustrated in Example 2. 6.8 parts of cyclo-bis-4,4' - (α,α' - diphenyl - α,α,α',α' - tetramethylxylylyl)dicarbonate having a flow point of 324° to 334° C. were obtained. An additional 5 parts of the dicarbonate were obtained by permitting the filtrate to stand for an additional 19 hours and purifying the separated solid product in a like manner. The total amount of dicarbonate thus obtained was 11.8 parts. The properties of the product were identical with those obtained for the product of Example 1.

*Example 4*

The process of Example 3 was employed except that 0.5 part of stearyldimethylbenzylammonium chloride was added to the reactants prior to addition of the nitrogen-diluted phosgene. A yield of 10.4 parts of the cyclic dicarbonate possessing a flow point of 310° to 330° C. was obtained.

The following examples 5 to 7 are given to illustrate the conversion of cyclic dicarbonate of this invention to α,α' - bis(p - hydroxyphenyl)1,4 - diisopropylbenzene polycarbonate resins.

*Example 5*

3 parts of the cyclic dicarbonate were charged to a reactor which was then evacuated at ambient temperatures to a pressure of 0.07 to 0.10 millimeter Hg. These reaction conditions were maintained for a period of one hour to remove any water moisture or extraneous solvents which might have been present. The temperature of the reactor was then increased to 350° C. for a period of 45 minutes while maintaining the aforementioned reduced pressure. At the end of this period, the temperature was decreased to 25° C. and the pressure in the reactor was permitted to increase to about 1 atmosphere. The resulting reaction mixture was then dissolved in ethylene dichloride and divided into 2 equal portions. The first portion was evaporated to dryness and produced a film of α,α' - bis(p - hydroxyphenyl)1,4 - diisopropylbenzene polycarbonate which possessed an inherent viscosity of 0.346 in ethylene dichloride. The remaining portion of ethylene dichloride solution was concentrated to about 40 parts and then poured into 95 parts of acetone which was maintained at temperature of about 5° C. α,α' - bis(p - hydroxyphenyl)1,4 - diisopropylbenzene polycarbonate which possessed an inherent viscosity of 0.446 in ethylene dichloride precipitated from the acetone, was filtered and dried. The α,α'-bis(p-hydroxyphenyl)1,4 - diisopropylbenzene polycarbonate secured from both portions exhibited a melting point of 200° to 210° C. Such polycarbonate exhibits the physical properties illustrated in Table II.

TABLE II

| Properties | Test Method ASTM No. | Results |
|---|---|---|
| Specific gravity, 23/23° C | D792 | 1.1414 |
| Specific volume, cu. in./lb | D792 | 24 |
| Glass transition temp., ° C | D1043 | 154 |
| Elastic modulus, p.s.i | D747 | 480,000 |
| Compressive strength, p.s.i | D695 | 11,500 |
| Flexural strength, p.s.i | D790 | 15,000 |
| Heat distortion, ° C | D648 | 152 |
| Rockwell hardness, R scale | D785 | 117 |
| Melting point, powder, ° C | (¹) | 195 |

¹ Differential thermal analysis.

*Example 6*

2 parts of the cyclic dicarbonate of this invention were charged to a reactor followed by $3 \times 10^{-6}$ part of potassium hydroxide and 4.5 parts of distilled diethyl carbitol. The reactor was immediately evacuated in order to remove water by reducing the pressure to about 1 millimeter Hg at ambient temperature. After 1 hour the reactor containing the reaction mixture was removed, sealed and transferred to a heating block maintained at a temperature of 240° C. for a period of 2 hours. The resulting hot solution was clear. Upon cooling, α,α'-bis(p-hydroxyphenyl)1,4 - diisopropylbenzene polycarbonate precipitated as a waxy solid. This precipitate was then washed with water and acetone, and α,α'-bis(p-hydroxyphenyl)1,4-diisopropylbenzene polycarbonate was isolated by filtration followed by drying in a vacuum oven maintained at a temperature of 75° C. 2 parts of α,α'-bis(p-hydroxyphenyl)1,4 - diisopropylbenzene polycarbonate having a melting point of 190° to 197° C. and an inherent viscosity of 0.244 in ethylene dichloride were obtained.

*Example 7*

2 parts of the cyclic dicarbonate were added to a reactor containing 0.03 part of phenylmagnesium bromide in 0.9 part of diethyl carbitol. The reactor was evacuated and heated at temperature of 200° C. for 2 hours. The reaction mixture was then cooled overnight and α,α'-bis(p-hydroxyphenyl)1,4 - diisopropylbenzene polycarbonate precipitated. The precipitate was extracted with water, filtered and dried. 1.9 parts of α,α'-bis(p-hydroxyphenyl)1,4-diisopropylbenzene polycarbonate having a melting point of 185° to 196° C. and an inherent viscosity of 0.262 in ethylene dichloride were obtained.

Although certain preferred embodiments of the invention have been disclosed for purpose of illustration, it will be evident that various changes and modifications may be made therein without departing from the scope and spirit of the invention.

We claim:

1. Cyclo-bis-4,4'-(α,α'-diphenyl-α,α,α',α' - tetramethylxylylyl)dicarbonate of the formula:

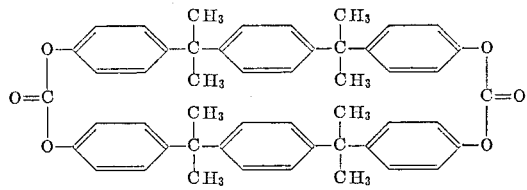

2. A process for the preparation of cyclo-bis-4,4'-(α,α'-diphenyl - α,α,α',α' - tetramethylxylylyl)dicarbonate which comprises admixing an aqueous alkaline solution possessing a pH of at least about 9 and containing about 0.1 to 5 percent by weight of α,α'-bis(p-hydroxyphenyl)1,4-diisopropylbenzene with an inert substantially water-insoluble organic solvent, agitating the mixture so as to create an emulsion thereof, passing phosgene into the emulsion in the presence of a phosgenation catalyst at rate such that the weight ratio per minute of phosgene contacted with the emulsion is no greater than about $10^{-3}:1$ and recovering the dicarbonate from the resulting reaction mass.

3. A process in accordance with claim 2 wherein the aqueous alkaline solution contains about 1 to 3 percent by weight of α,α'-bis(p-hydroxyphenyl)1,4-diisopropylbenzene.

4. A process in accordance with claim 2 wherein the phosgene is introduced at rate such that the weight ratio per minute of phosgene contacted with the emulsion is about $10^{-5}-10^{-3}$ to 1.

5. A process in accordance wtih claim 2 wherein the aqueous alkaline solution possesses a pH of at least about 11.

6. A process in accordance with claim 2 wherein the total mol ratio of phosgene to α,α'-bis(p-hydroxyphenyl) 1,4-diisopropylbenzene is about 0.5-1.25 to 1.

7. A process in accordance with claim 2 wherein the total mol ratio of phosgene to α,α'-bis(p-hydroxyphenyl) 1,4-diisopropylbenzene is about 0.8-1.1 to 1.

8. A process in accordance with claim 2 wherein the organic solvent is selected from the group consisting of benzene and its alkylated and chlorinated derivatives.

9. A process in accordance with claim 2 wherein the catalyst possesses the following formula $$[AR_1R_2R_3R_4]^+ \ X^-$$

wherein A is a member of the group consisting of nitrogen, arsenic and phosphorus, $R_1$, $R_2$, $R_3$ and $R_4$ are members selected from the group consisting of alkyl, alkenyl, aryl and aralkyl and X is a member selected from the group consisting of hydroxy and halogen.

10. A process for the preparation of a ploycarbonate resin consisting essentially of recurring units of the formula:

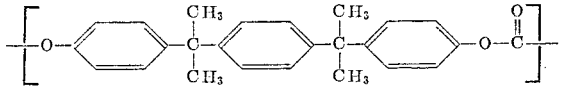

which comprises heating cyclo-bis-4,4'-(α,α'-diphenyl-α, α,α',α'-tetramethylxylylyl)dicarbonate at a temperature of about 325° to 375° C.

11. A process in accordance with claim 10 wherein the reaction is carried out under substantially anhydrous conditions.

12. A process in accordance with claim 10 wherein the reaction is carried out under vacuum.

13. A process for the preparation of a polycarbonate resin consisting essentially of recurring units of the formula:

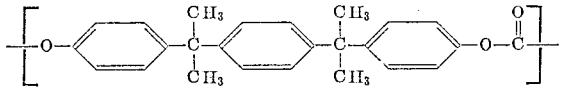

which comprises treating cyclo-bis-4,4'-(α,α'-diphenyl-α, α,α',α'-tetramethylxylylyl)dicarbonate with an anionic catalyst in the presence of an inert organic solvent and heating the resulting mixture to temperature of at least about 200° C.

14. A process in accordance with claim 13 wherein the anionic catalyst is selected from the group consisting of alkali metal hydroxides, alkylmagnesium halide and arylmagnesium halides.

15. A process for the preparation of a polycarbonate resin consists essentially of recurring units of the formula:

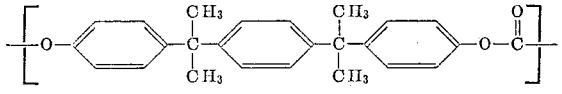

which comprises admixing an aqueous alkaline solution possessing a pH of at least about 9 and containing about 0.1 to 5% by weight of $\alpha,\alpha'$-bis(p-hydroxyphenyl)1,4-diisopropylbenzene with an inert, substantially water-insoluble organic solvent, agitating the mixture so as to create an emulsion thereof, passing phosgene into the emulsion in the presence of a phosgenation catalyst at rate such that the weight ratio per minute of phosgene contacted with the emulsion is no greater than about $10^{-3}$ to 1, recovering cyclo-bis-4,4'-($\alpha,\alpha'$-diphenyl-$\alpha,\alpha,\alpha',\alpha'$-tetramethylxylylyl)dicarbonate from the resulting reaction mass and heating the dicarbonate at temperature of about 325° to 375° C.

References Cited by the Examiner

UNITED STATES PATENTS

| | | | |
|---|---|---|---|
| 3,137,706 | 6/1964 | Prochaska | 260—47 |
| 3,155,683 | 11/1964 | Moody | 260—47 |

FOREIGN PATENTS

| | | |
|---|---|---|
| 1,293,289 | 4/1962 | France. |
| 620,620 | 11/1962 | Belgium. |

OTHER REFERENCES

Schnell et al.: Makromolekulare Chemie, vol. 57, 1962, pp. 1–11.

Schnell et al.: Chem. Abstracts 59, 516 (1963).

SAMUEL H. BLECH, *Primary Examiner.*